(12) United States Patent
Stilley et al.

(10) Patent No.: US 6,554,239 B2
(45) Date of Patent: Apr. 29, 2003

(54) CRADLE FOR CONNECTING TWO HAND-HELD DEVICES TO FORM A SINGLE UNIT

(75) Inventors: Rusell L. Stilley, Allen, TX (US); Matthew T. Nicolosi, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/932,174

(22) Filed: Aug. 17, 2001

(65) Prior Publication Data

US 2002/0044407 A1 Apr. 18, 2002

Related U.S. Application Data

(60) Provisional application No. 60/227,420, filed on Aug. 23, 2000.

(51) Int. Cl.[7] .............................. A47F 5/00; F16M 11/00
(52) U.S. Cl. ................................. 248/309.1; 248/176.1; 248/316.7
(58) Field of Search ........................... 248/176.1, 309.1, 248/310, 316.3, 316.2, 316.1, 316.7; 379/446, 455

(56) References Cited

U.S. PATENT DOCUMENTS

| | | | | |
|---|---|---|---|---|
| 4,747,570 A | * | 5/1988 | Takahashi | 248/309.1 |
| 5,192,042 A | * | 3/1993 | Wotring | 248/176 |
| D362,764 S | * | 10/1995 | Dumatol | D6/449 |
| 5,463,688 A | * | 10/1995 | Wijas | 279/446 |
| 5,648,757 A | * | 7/1997 | Vernace | 340/539 |
| 5,694,468 A | * | 12/1997 | Hsu | 279/446 |
| D397,246 S | * | 8/1998 | Hoofnagle | D3/201 |
| 5,825,874 A | * | 10/1998 | Humphreys | 379/446 |
| 5,832,082 A | * | 11/1998 | Nagai | 279/449 |
| 5,956,399 A | * | 9/1999 | Whitley | 279/446 |
| 5,996,956 A | * | 12/1999 | Shawver | 248/309.1 |
| D452,496 S | * | 12/2001 | Murnaghan | D14/242 |
| D460,075 S | * | 7/2002 | Destefano | D14/428 |

* cited by examiner

*Primary Examiner*—Anita King
*Assistant Examiner*—Amy J. Sterling
(74) *Attorney, Agent, or Firm*—Bret J. Petersen; W. James Brady; Frederick J. Telecky, Jr.

(57) ABSTRACT

A cradle for attaching two portable hand-held devices to each other. The cradle holds the devices such that one is substantially atop the other. The cradle has a bottom rim that releasably holds one device. A top rim that releasably holds the other device. Alternative attachment mechanisms for the rims provide either a sliding groove-and-flange type attachment for which the device is specifically designed, and/or a push in type attachment.

13 Claims, 3 Drawing Sheets

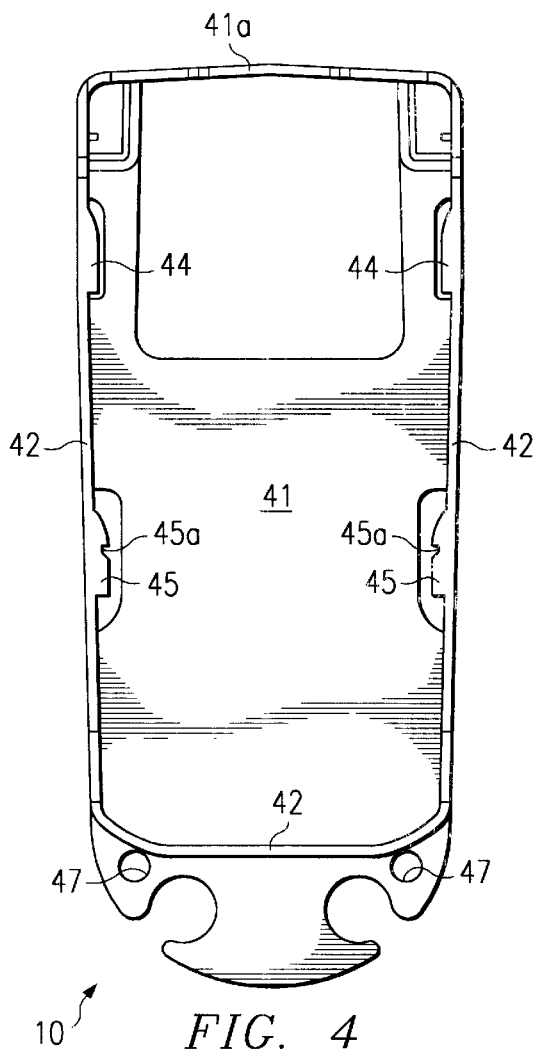
FIG. 4
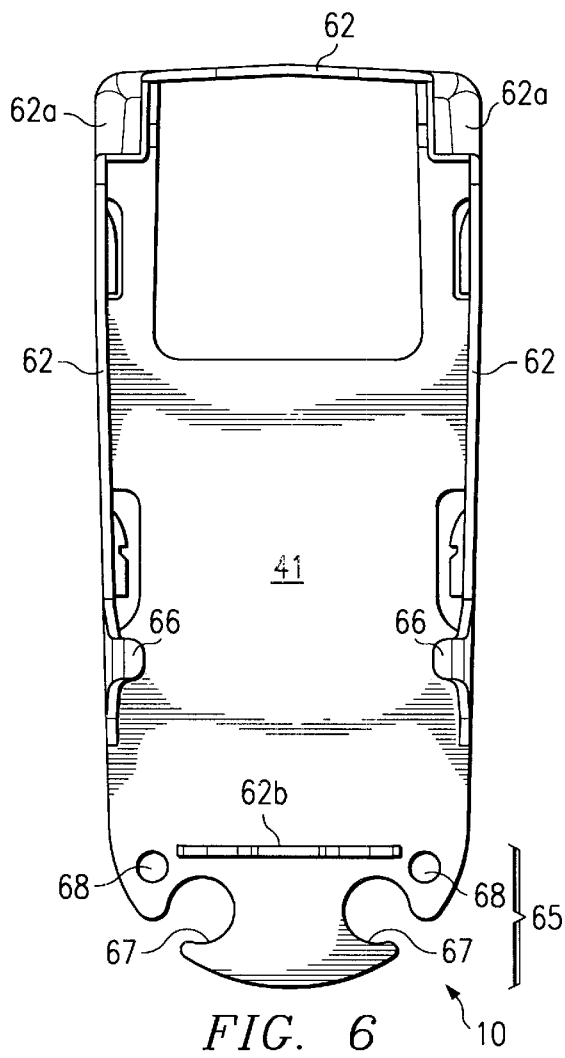
FIG. 6
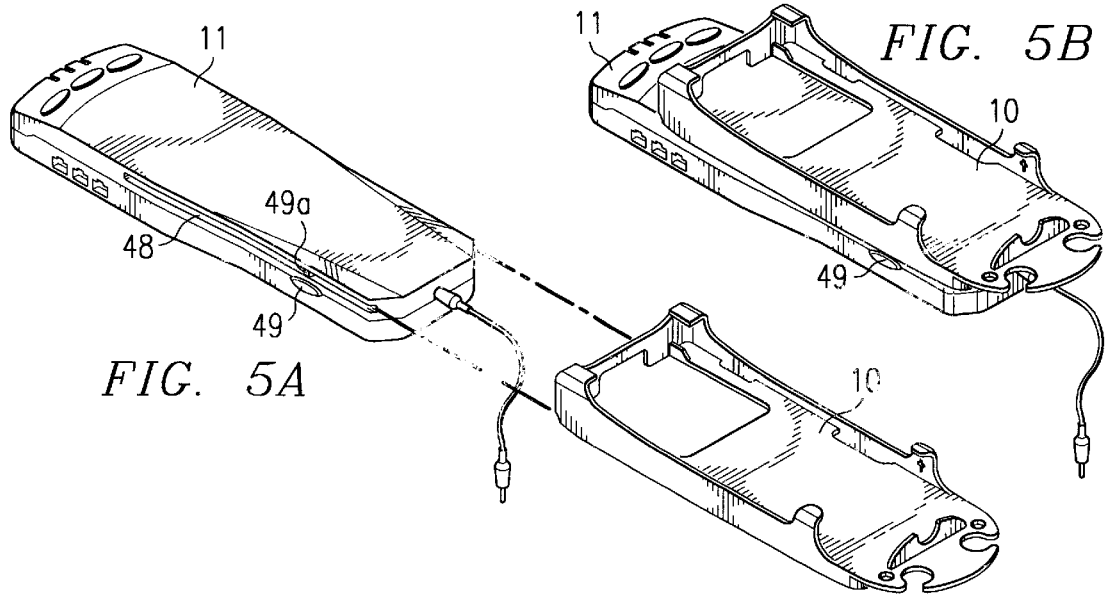
FIG. 5A
FIG. 5B

CRADLE FOR CONNECTING TWO HAND-HELD DEVICES TO FORM A SINGLE UNIT

This application claims priority under 35 USC §119(e)(1) of provisional application No. 60/227,420 filed Aug. 23, 2000.

TECHNICAL FIELD OF THE INVENTION

This invention relates to hand-held consumer devices, such as computers, calculators, and telephones, and more particularly to a cradle that attaches two such devices together for portable one-handed use of the two devices.

BACKGROUND OF THE INVENTION

Hand-held calculator-based data collection devices are becoming increasingly popular for math and science students in high school and college. These devices provide an interface for a variety of sensors and probes, such as for motion detection, force sensing, pH sensing, temperature sensing, and barometric sensing. The devices are operable on battery power and can be taken out of the classroom for a vast variety of experiments. In short, they permit students to collect and analyze real-world data.

Typically, the data collection device may be used in two modes: as a stand alone device or connected to a hand-held calculator with a linking cable. Programs on the calculator may be used to set up data collection parameters, to control data collection, and the analyze the data.

An example of a data collection device is the CBL-2 manufactured by Texas Instruments Incorporated. The user may collect data without a calculator using the data collection device and its associated probes. The calculator may then be reconnected to the calculator to analyze the data.

When the calculator is used with the data collection device, handling both devices can be cumbersome. If a probe is also used, there are three separate devices that must be held. Users have devised various ways to handle all of the devices, such as by using tape, cable ties, fanny packs, and fishing vests.

Other types of consumer electronics devices, such as computers and telephones, are also sometimes used in pairs. For example, a computer might be used with a telephone or with a peripheral device such as a display or printer. In this case, portability of the two devices becomes a problem similar to that encountered for a data collection device used with a calculator.

SUMMARY OF THE INVENTION

One aspect of the invention is a cradle for connecting two portable hand-held devices. In one embodiment of the invention, it is assumed that at least one of the devices has a grooved channel along each of its sides. The cradle has a center frame, a bottom rim for holding one of the devices, and a top rim for holding the other device. The center frame is placed between the devices, such that the two devices are be stacked one substantially atop the other with the center frame between them. The bottom rim holds the device having the grooved channels, using a groove-and-flange mechanism. Specifically, the bottom rim has two side portions, each having a flange that extends inwardly parallel to and spaced from the center frame. Each flange is operable to slide inside the grooved channel. The top rim holds the other device, using a push-in mechanism. It is has two side portions and a front portion. The front portion has a lip extending inwardly parallel to the center frame. The device can be pushed under this lip. The top rim's side portions may also have flexible tabs that releasably secure the device within the top rim.

An advantage of the invention is that it securely holds the two devices together, making them a single unit. This permits one-handed use, and if the unit has a neck or waist strap, hands free use is also possible.

When in use, the cradle does not interfere with the keys or display of either device. If the devices are connected by a cable, it protects the cable plugs from damage if the unit is dropped.

The same cradle may be used with a variety of different sized devices. Because it is made from a single piece of material, manufacturing costs are reduced.

BRIEF DESCRIPTION OF THE DRAWINGS

FIG. 4 is a bottom view of the cradle.

FIGS. 5A and 5B illustrate how a device is attached to the bottom side of the cradle.

FIG. 6 is a top view of the cradle.

DETAILED DESCRIPTION OF THE INVENTION

Figure 1:
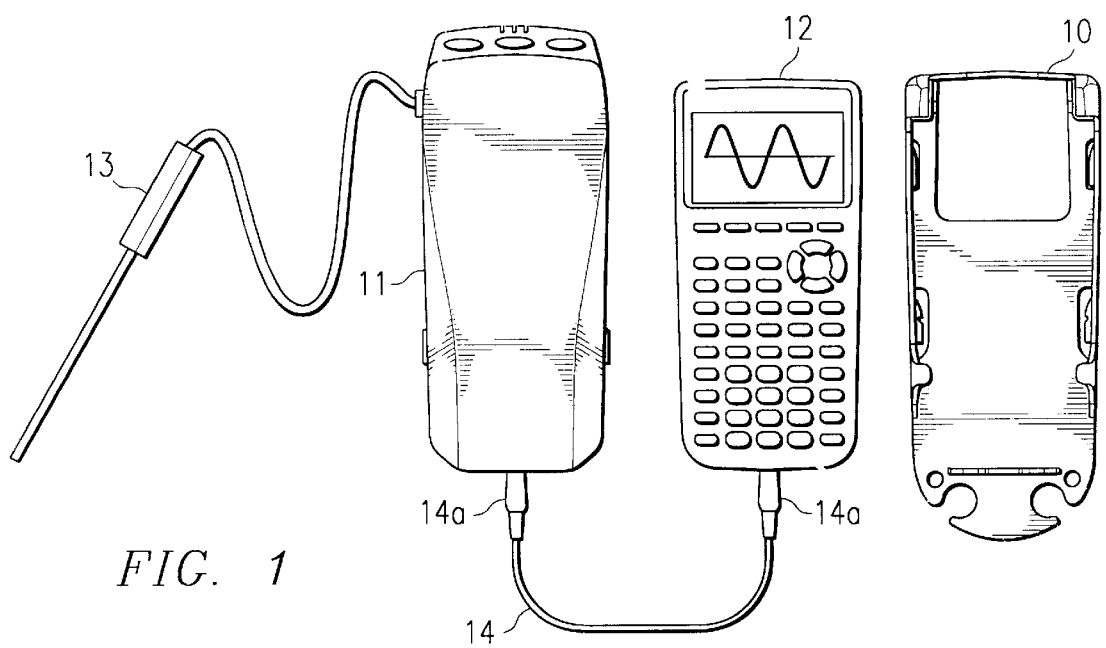
FIG. 1 illustrates the cradle in accordance with the invention, as well as two devices to be attached together with the cradle.

FIG. 1 illustrates a cradle 10, as well as two electronic devices to be attached together with the cradle. FIG. 1 is a top plan view, showing the top surface of cradle 10 and the top surface of each of the two devices to be attached to each other. In the example of FIG. 1, these two devices are a hand-held data collection device 11 and a hand-held calculator 12.

Although the following description is in terms of using cradle 10 to attach a data collection device 11 to a calculator 12, the same concepts could be applied to connect any two portable hand-held electronic devices. As indicated in the Background, various portable handheld devices, such as telephones, computers, audio or visual recording or playing equipment, and various peripheral devices could all be used in pairs.

In FIG. 1, cradle 10 is shown physically separated from data collection device 11 and calculator 12. As explained below, cradle 10 is used to mechanically attach these two devices together. A probe 13 is used for sensing a real world measurement, such as temperature. A cable 14 provides data communication between the data collection device 11 and the calculator 12.

As is better illustrated and described below in connection with FIGS. 4–9, cradle 10 has four main parts: a center frame, a top rim, a bottom rim, and a cable protector. When cradle 10 is in use to attach two devices, the center frame lies between the devices. Each of the two rims holds one of the devices in place.

As stated in the Background, data collection device 11 a hand-held, calculator-based device. In one configuration of device 11, calculator 12 is used to set up data collection parameters, which are communicated to the data collection device 11. Depending on the type of probe 13, the calculator 12 may be required to be connected during data collection. Once the data is collected, the user can analyze the data with calculator 12. Users can gather a variety of real world data using different types of probes 13. Although the data collection device 11 of FIG. 1 has no screen, other types may have a screen to display status messages and data.

Figure 2:
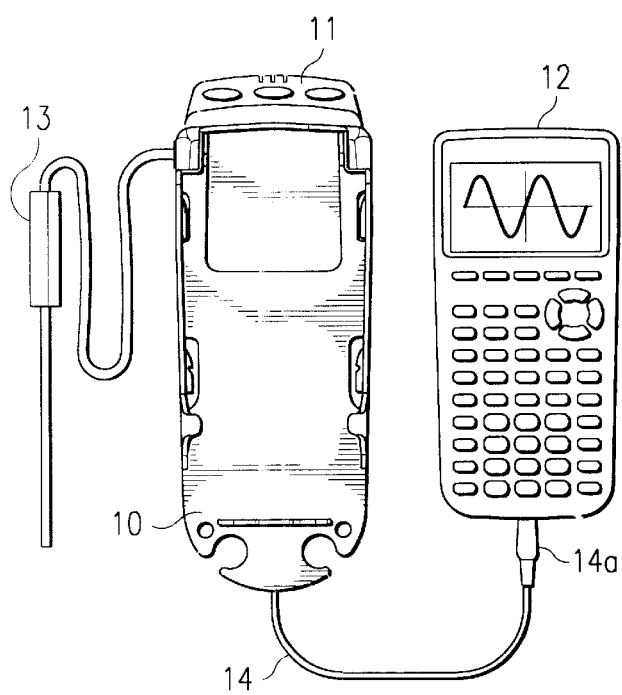
FIG. 2 illustrates one of the devices of FIG. 1 attached to the bottom side of the cradle.

FIG. 2 illustrates cradle 10 attached to data collection device 11. This is a first step of attaching the two electronic devices together with cradle 10. As illustrated, the bottom surface of cradle 10 is attached to the top surface of data collection device 11. As explained below in connection with FIGS. 4, 5A, and 5B, a bottom rim of cradle 10 securely holds the data collection device 11 within cradle 10.

Figure 3:
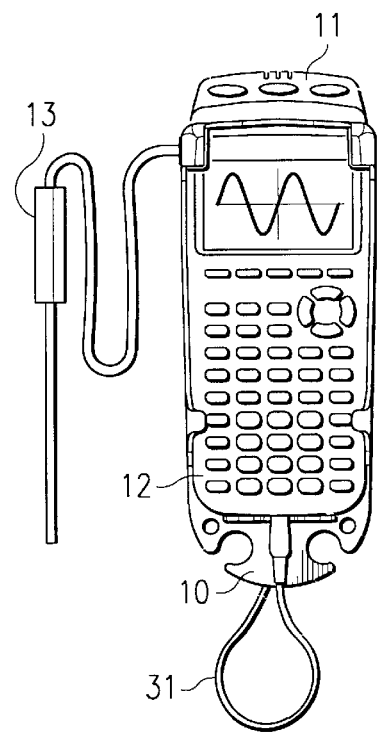
FIG. 3 illustrates both devices of FIG. 1 attached to the cradle, one to the bottom side and another to the top side.

FIG. 3 illustrates the second step of connecting data collection device 11 to calculator 12. Now, the bottom surface of calculator 12 is attached to the top surface of cradle 10. As explained below in connection with FIGS. 6 and 7, a top rim of cradle 10 securely holds calculator 12 within cradle 10. Cradle 10 does not block or interfere with the keys or display of calculator 12 or the cable ports of either device 11 or 12.

Depending on the types of electronic devices being connected, their positions could be reversed; it is not significant to the invention whether cradle 10 is designed to receive a top surface or bottom surface of a device. In general, however, it is desirable that any controls or displays remain accessible. For this reason, the bottom surface of calculator 12 rather than its top is placed against cradle 10. The top or bottom surfaces of the electronic devices are sometimes referred to herein as their "faces".

FIG. 4 illustrates a bottom view of cradle 10. As explained below, a bottom rim 42 is used to connect a first electronic device to the cradle 10. Bottom rim 42 makes use of a flange-and-groove type mechanism, for which the first electronic device is specifically designed.

Cradle 10 has a center frame 41, which is only partially closed in FIG. 4. That is, a portion of center frame 41 is open. Any such portion may be open so as to accommodate the geometry of one or the other of the two electronic devices.

Bottom rim 42 extends upwardly from center frame 41, normal to the side and back edges of center frame 41. There is no bottom rim 42 at the front edge of center frame 41. The two side portions of rim 42 have small flanges 45 extending inwardly, such that they are parallel to, but spaced from, the plane of center frame 41.

FIGS. 5A and 5B illustrate how data collection device 11 and cradle 10 may be attached together. The attachment exemplified by FIGS. 5A and 5B achieves the configuration of FIG. 2. Data collection device 11 has grooves 48 along each of its sides. Flanges 45 of bottom rim 42 are located and sized to fit into these grooves 48.

As indicated in FIG. 5A, data collection device 11 is inserted into cradle 10 by placing the front of cradle 10 at the top surface of the back of data collection device 11. The flanges 45 of bottom rim 42 are placed in the grooves 48 of data collection device 11. The bottom of cradle 10 is then slid along the top of data collection device 11. The flanges 45 slide along the grooves 48 until the front of cradle 10 substantially coincides with the front of data collection device 11. The length of grooves 48 can be designed so that the cradle 10 stops at the desired position.

To further secure data collection device 11 within cradle 10, each flange 45 has a notch 45a. A button 49 on each side of data collection device 11 operates a small hinged wing 49a that fits into notch 45a. When data collection device 11 is slid into place within cradle 10, the wing 49a snaps into place within notch 45a. To separate data collection device 11 from cradle 10, the button 49 is pressed, which causes wing 49a to retract toward data collection device 11 and to be released from the notch 45a.

FIG. 6 illustrates a top view of cradle 10. Top rim 62 is used to attach a second electronic device to cradle 10.

Top rim 62 uses a "push-in" mechanism for this attachment. In contrast to the groove-and-flange mechanism of FIG. 4, this push-in mechanism permits cradle 10 to hold devices that are not necessary designed for use with cradle 10. Also, the push-in type of attachment may permit some degree of variance in the device to be attached. In other words, the device need not have grooved sides and within a reasonable range of dimensions, it may simply be snapped into place.

Top rim 62 extends upwardly, normal to the side edges of center frame 41, as well as from the front edge of center frame 41. At least a portion of the front portion of rim 62 turns inwardly parallel to, but spaced from, center frame 41. This forms a "lip", under which the front edge of an electronic device may be placed. In the example of FIG. 6, two corners 62a are turned inwardly in this manner to form this lip.

The two side portions of rim 62 each have at least one tab 66 protruding from rim 62 and turning slightly inward at their upper edge. Tabs 66 are made from a material having a spring-like characteristic, such as a semi-rigid plastic. This characteristic of tabs 66 permits calculator 12 to be snapped into place under the inwardly turned upper edge of tabs 66, as well as to be removed by manually lifting calculator 12 from the grasp of tabs 66.

Figure 7:
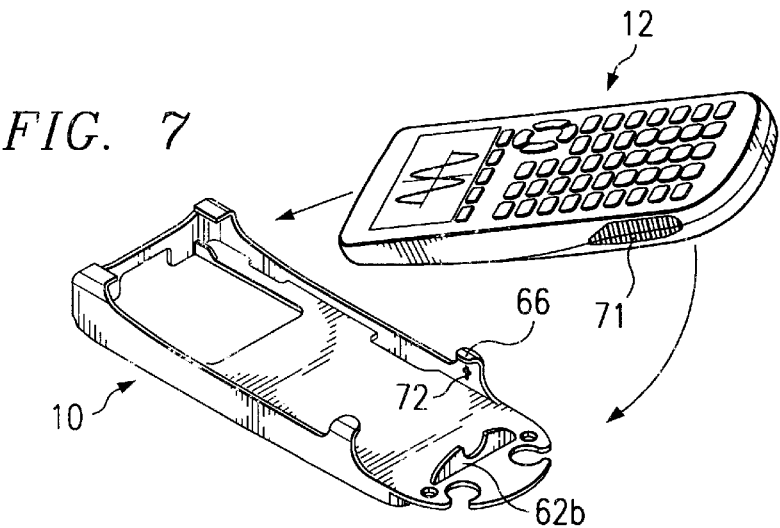
FIG. 7 illustrates how a device is attached to the top side of the cradle.
Figure 8:
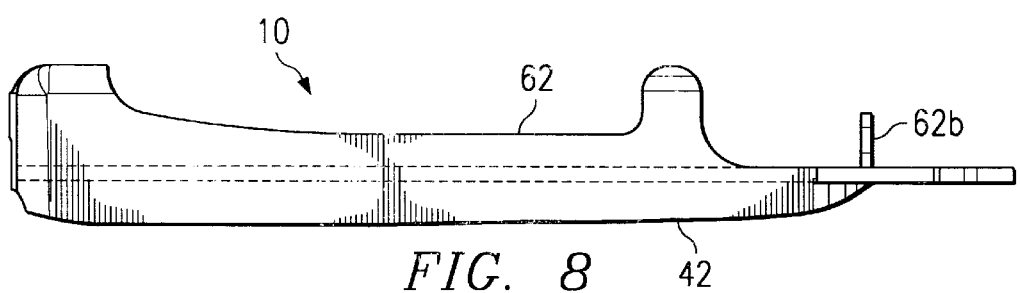
FIG. 8 is a left side view of the cradle.
Figure 9:
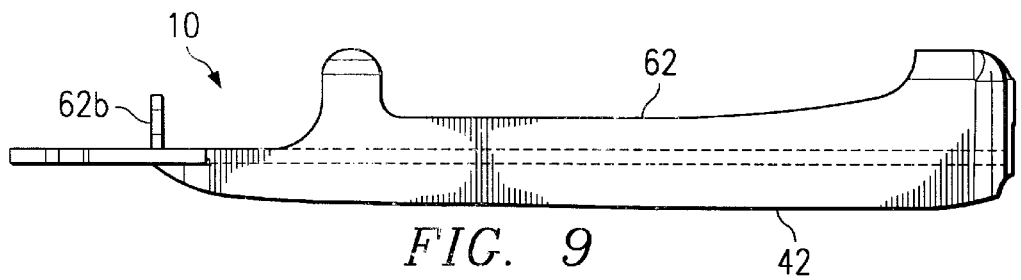
FIG. 9 is a right side view of the cradle.
Figure 10:
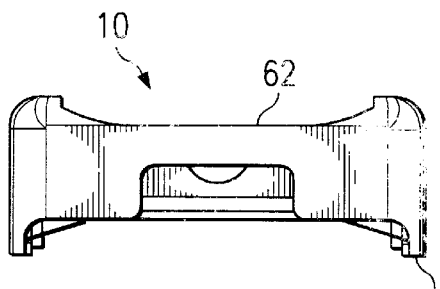
FIG. 10 is a top view of the cradle.
Figure 11:
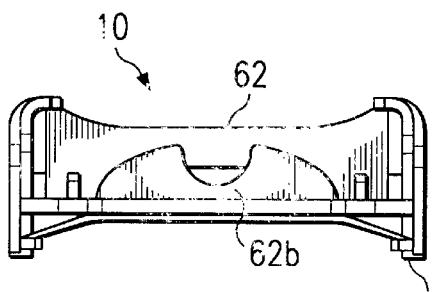
FIG. 11 is a bottom view of the cradle.

FIG. 7 illustrates how an electronic device, such as calculator 12, may be attached to the top of cradle 10. The attachment exemplified by FIG. 7 achieves the calculator-to-cradle configuration of FIG. 3.

As illustrated in FIG. 7, calculator 12 is attached to cradle 10 by sliding the front end of calculator 12 under the front portion of rim 62. The front end of calculator 12 fits under corners 62a, which prevent calculator 12 from moving in all directions other than toward the back of cradle 10. Movement of calculator 12 from the back of cradle 10 is inhibited by the back portion 62b of rim 62. Tabs 66 provide a further means for securing calculator 12 within cradle 10.

FIG. 7 further illustrates how calculator 12 may have a series of ribs 79a along one or both of its sides. Tabs 66 have a ridge 79b on their inner surface. The friction of the ribs 79a against ridge 79b provides further security for calculator 12 by preventing movement of calculator 12 within cradle 10. This feature also permits a greater range of lengths of devices that may be placed within cradle 10.

Variations in the geometry of top rim 62 reflect design choices, which present a choice between a snug fit for a particular calculator 12 or a roomy fit that will accommodate a variety of differently sized calculators 12. For example, if top rim 62 is deep, cradle 10 can be used with calculators that are greater in thickness. The size of corners 62a and the distance of the inward protrusion of tabs 66 can be increased to accommodate a greater range of widths of whatever device is to be placed within cradle 10.

Referring again to FIG. 6, a cord protector 65 extends from the back of cradle 10. As shown in FIG. 1, often, as is the case with data collection device 11 and calculator 12 a cable 14 is used to connect the two devices together. Cord protector 65 protects the plug ends of cable 14. Without cord protector 65, the plug connectors of each device would be vulnerable to damage if the unit comprising the data collection device 11 and calculator 12 were to be dropped.

Cord protector 65 further has slots 67, which provide a means for holding excess portions of cable 14. Openings 68 permit a strap (not shown) to be attached. The strap can then be placed around the user's neck and the devices 11 and 12 worn like a necklace. A wrist or waist strap could similarly be attached. This leaves the user's hands free for operating the probe 13 or for other purposes.

For manufacturing purposes, one or more of the four main parts of cradle 10 may be made from a single piece of material. In fact, the entire cradle 10 may be fabricated from a single piece of material. An example of a suitable material for cradle 10 is a rigid or semi-rigid plastic. As explained below, a semi-rigid material will permit a desired flexibility for certain elements of cradle 10, such as tabs 66.

Although the above-described embodiment of cradle 10 has a different attachment mechanism on each side, other embodiments are possible. In other words, both rims could have the same attachment mechanism. Thus, cradle 10 could have a top rim and a bottom rim that are both of the groove-and-flange design of FIG. 4. Or, both the top rim and the bottom rim could have the spring tab design of FIG. 6.

Other Embodiments

Although the present invention has been described in detail, it should be understood that various changes, substitutions, and alterations can be made hereto without departing from the spirit and scope of the invention as defined by the appended claims.

What is claimed is:

1. A cradle for connecting two portable hand-held devices, at least one of the devices having a grooved channel along each of its sides, comprising:
    a center frame for placement between one side of a first electronic device and a side of a second electronic device, such that the two devices may be located one substantially atop the other with the center frame between them;
    a bottom rim operable to receive a first electronic device, the bottom rim comprised of two side portions extending downwardly, normal to the side edges of the center frame, each side portion having at least one flange extending inwardly parallel to and spaced from the center frame, each flange operable to fit inside the grooved channel of a corresponding side of the first device;
    a top rim operable to receive a second device, the top rim comprised of two side portions extending upwardly, normal to the side edges of the center frame, and having a front portion extending upwardly, normal to the front edge of the center frame, the front portion having a lip extending inwardly parallel to the center frame, the lip operable to cover at least a portion of the front of the second device; and
    a cord protector extending from one end of the center frame.

2. The cradle of claim 1, wherein at least a portion of the center frame is a solid flat plate.

3. The cradle of claim 1, wherein the center frame and at least one rim are made from a single piece of material.

4. The cradle of claim 1, wherein the top rim further has a back portion extending normal to the center frame.

5. The cradle of claim 1, wherein the lip is comprised of a corner piece adjacent each side portion of the top rim.

6. The cradle of claim 1, wherein the top rim further has a flexible tab protruding from each side portion that releasably secures the second device within the top rim.

7. A cradled portable hand-held device for use with a second device, comprising:
    a grooved device having grooves along its sides; and
    a cradle having the following elements: a center frame for placement between one side of a first device and a side of a second device, such that the two devices may be located one substantially atop the other with the center frame between them; a bottom rim comprised of two side portions extending downwardly, normal to the side edges of the center frame, the bottom rim operable to receive a first device, each side portion having at least one flange extending inwardly parallel to and spaced from the center frame, each flange operable to fit inside the grooves of a corresponding side of the device; and a top rim operable to receive the second device, and
    a cord protector extending from one end of the center frame.

8. The device of claim 7, wherein the bottom rim further has a notch in at least one side portion, and wherein the grooved device has a button-wing mechanism for releasably locking the wing in the notch.

9. The device of claim 7, wherein the top rim is comprised of two side portions extending upwardly, normal to the side edges of the center frame, and having a front portion extending upwardly, normal to the front edge of the center frame, the front portion having a lip extending inwardly parallel to the center frame, the lip operable to cover at least a portion of the front of the second device.

10. The device of claim 7, wherein the center frame and at least one rim are made from a single piece of material.

11. The device of claim 7, wherein the top rim further has a back portion extending normal to the center frame.

12. The device of claim 7, wherein the lip is comprised of a corner piece adjacent each side portion of the top rim.

13. The device of claim 7, wherein the top rim further has a flexible tab protruding from each side portion that releasably secures the second device within the top rim.

* * * * *